US012605971B2

(12) United States Patent

Guillou et al.

(10) Patent No.: US 12,605,971 B2

(45) Date of Patent: Apr. 21, 2026

(54) METHOD FOR ESTIMATING THE STATE OF WEAR OF A TIRE

(71) Applicant: COMPAGNIE GENERALE DES ETABLISSEMENTS MICHELIN, Clermont-Ferrand (FR)

(72) Inventors: Melaine Guillou, Clermont-Ferrand (FR); Xavier Marduel, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 176 days.

(21) Appl. No.: 18/019,376

(22) PCT Filed: Jul. 28, 2021

(86) PCT No.: PCT/FR2021/051408

§ 371 (c)(1),
(2) Date: Feb. 2, 2023

(87) PCT Pub. No.: WO2022/029382

PCT Pub. Date: Feb. 10, 2022

(65) Prior Publication Data

US 2023/0271458 A1    Aug. 31, 2023

(30) Foreign Application Priority Data

Aug. 3, 2020    (FR) ...................................... 2008233

(51) Int. Cl.
B60C 11/24 (2006.01)
B60C 19/00 (2006.01)
G01M 17/02 (2006.01)

(52) U.S. Cl.
CPC .......... B60C 11/246 (2013.01); B60C 11/243 (2013.01); G01M 17/02 (2013.01); B60C 2019/004 (2013.01)

(58) Field of Classification Search
CPC ................. B60C 11/243; B60C 11/246; B60C 2019/004; G01M 17/02
See application file for complete search history.

(56) References Cited

U.S. PATENT DOCUMENTS 8,731,767 B2 * 5/2014 Paturle ................... B60C 11/04
701/31.4
10,365,248 B2 7/2019 Paturle et al.
(Continued)

FOREIGN PATENT DOCUMENTS

FR    3015036 A1    6/2015
KR    10-2020-0083026 A    7/2020
(Continued)

OTHER PUBLICATIONS

International Search Report dated Nov. 12, 2021, in corresponding PCT/FR2021/051408 (4 pages).

*Primary Examiner* — Kristina M Deherrera
*Assistant Examiner* — Gedeon M Kidanu
(74) *Attorney, Agent, or Firm* — VENABLE LLP

(57) ABSTRACT

A method for estimating the state of wear of a tire comprises: recording a vibroacoustic signal (1001) produced by the tire running on a road during a time frame; converting the time signal (1001) into a frequency signal (1002) over a frequency range; segmenting the frequency range into frequency bands and associating a datum representing the frequency signal with each band, with the representative datum forming a variable of a matrix (1003); predicting a state of wear from the matrix, by means of machine learning (1004) from the data based on a learning database, according to modalities each representing a state of wear of the tire;

(Continued)

and determining the state of wear of the tire (1005) after a number N of identical predictions in a series M of consecutive predictions.

11 Claims, 5 Drawing Sheets

(56)                    References Cited

U.S. PATENT DOCUMENTS

| | | | |
|---|---|---|---|
| 10,960,712 B2 | 3/2021 | Storti et al. | |
| 10,989,561 B2 | 4/2021 | Paturle et al. | |
| 2016/0349219 A1* | 12/2016 | Paturle | B60C 23/00 |
| 2019/0003852 A1 | 1/2019 | Paturle et al. | |
| 2020/0001662 A1* | 1/2020 | Storti | B60C 11/246 |

FOREIGN PATENT DOCUMENTS

| | | | |
|---|---|---|---|
| WO | 2017/103474 A1 | 6/2017 | |
| WO | 2020/005346 A1 | 1/2020 | |

* cited by examiner

METHOD FOR ESTIMATING THE STATE OF WEAR OF A TIRE

FIELD OF THE INVENTION

The present invention relates to a method for estimating the state of wear of a tire fitted on a vehicle traveling on a road, on the basis of the noise generated by the tire when it is in dynamic contact with the ground.

TECHNOLOGICAL BACKGROUND

It is worthwhile knowing the state of wear of the tire in order to interact with the driver or the driver assistance systems, so as to notify them in real time of a change in the gripping conditions of the tire and of the road holding of the vehicle that are particularly due to the change in the state of wear of the tire.

Thus, patent application WO 2017/103474 A1 proposes a method that combines both the state of wear of the tire and the state of the ground on which the tire is running. However, this method, which is possible when on board a vehicle, uses a significant number of parameters that are to be managed by discriminant analysis. This high number of parameters results in computation times and computation resources that make this method difficult to implement at an acceptable processing cost, irrespective of the type of motor vehicle, and in particular entry level vehicles. In addition, the reliability of the method is also affected by indirect consideration of the influence of the running speed when processing data.

One of the aims of the following invention is intended to propose a method for highlighting the evolution of the state of wear of the tire using an autonomous method, i.e., without human intervention and without immobilization of the vehicle. In addition, the method must be easy to implement, with reduced costs and computation times, in order to facilitate real-time processing, in particular when post-processing of the data is carried out on the vehicle.

SUMMARY OF THE INVENTION

The invention relates to a method for estimating the state of wear of a tire of a mounted assembly of a vehicle traveling on a surface of a road, comprising the following steps:

recording a measurement of a vibroacoustic signal produced by the tire running on the road surface during a given time frame;

converting the time signal into a frequency signal over a given frequency range;

segmenting the frequency range into at least one frequency band with a predetermined width and associating at least one datum representing the frequency signal in said at least one frequency band with the at least one frequency band, with the at least one representative datum derived from the measurement forming at least one variable of a matrix associated with said measurement;

predicting a state of wear of the tire corresponding to the matrix associated with the completed measurement, by means of machine learning from the data based on a learning database made up of a set of matrices associated with measurements recorded and carried out according to the same steps as above, under known running conditions, according to modalities each representing a state of wear of the tire;

determining the state of wear of the tire after a number N of identical predictions in a series M of consecutive predictions.

The term "vibroacoustic signal" is understood herein to mean any vibration and/or acoustic signal that can be detected by a sensor, for example, of the microphone or accelerometer type.

The idea is to use a sensor that hardly modifies the response of the tire running on the surface of a road when the tire is fitted on a vehicle via a rim, for example. The condition of running the tire on the road generates a specific signature that it is vibratory and/or acoustic in a wide frequency spectrum. The principle involves measuring a time signal over a short time and converting this signal into a frequency signal, for which the useful information is more accessible since it is distributed over a wide frequency band. Assuming that the signal is pseudo-periodic, it is easy to contemplate converting a small time sample with a certain amount of sampling into a wideband frequency spectrum with a given frequency pitch. The sampling frequency determines the width of the frequency spectrum. Once this spectrum is obtained, it needs to be separated it into a large number of frequency bands, with each band representing a dimension of the matrix associated with the vibroacoustic signature. Then, for each band, one or more item(s) of data representing the frequency spectrum on the frequency band is/are identified. These representative data represent the second dimension of the matrix. These data representing the frequency spectrum are included in the group comprising, the average, the median, the maximum value, the minimum value or a combination of these quantities of the frequency spectrum. These representative data also can be quantities relating to the spectrum shape on the frequency band, which are expressed by the features on a frequency or a frequency band relative to the average level on the frequency band. The division into frequency bands for the size of the matrix can be implemented as a one-third octave band, for example.

Finally, the state of wear of the tire is predicted by machine learning based on matrices constructed from the model of those obtained using the matrix formed in the preceding step during a learning campaign. During this learning campaign, various tire running tests were carried out, during which a vibroacoustic measurement was recorded and then analyzed following the same protocol for each running test. Each running test was carried out on a specific vehicle with a known tire assembly, particularly including the level of wear of the tire according to various pressure and static load conditions applied around the nominal conditions. Each running test involved running the vehicle on a road, the macromolecular nature of which was predetermined, the meteorological conditions of the road were identified. To this end, the state of wear of the tire was split into at least two groups, referred to as new or worn groups, depending on the height of the tire tread. When the height of the tread for a tire that is fitted and inflated on a rim, ranging between the radially external height in the new state of the tread, called maximum height, and the minimum height corresponding to the radially external distance of the wear indicator at the bottom of the grooves of the tread, is located between the maximum height and the maximum mid-height that is at an equal distance from the maximum height and the minimum height, the state of the tire is referred to as "new", and conversely, it is referred to as "worn". It is also possible to separate the state of wear into a large number of identical sized categories. For example, if the intention is to qualify the state of wear of the tire between the "new", "half-worn" and "worn" state, the separation limits between these various states are reciprocally two thirds of the difference between the maximum height and the minimum height and a third of the difference in the heights. Thus, each category or group is distributed over a similar range of heights of the tread.

In this case, the large number of measurements and predictions of the state of wear of the tire statistically allows fast assessment of the wear category of the tire through a simple model. This simple mathematical model only requires a small learning database and generates a very fast response time. Thus, it is assumed that the occurrences N of the same prediction in a series of M measurements, for example, irrespective, for example, of the meteorological conditions of the road, the macro-rough nature of the road or the running speed, will allow the transition from one wear category of the tire to another to be detected. In fact, the state of wear of the tire changes slowly in the time domain compared to the other sensitive variables of the system. The same applies to the operating conditions of the tire through parameters such as the pressure or the applied static load. Of course, the series of measurements M will be dictated by the diversity of the measurement conditions and the number of occurrences N will be controlled by the precision of the prediction under said measurement conditions. Thus, unlike the model of the document of the prior art, it has been decided to multiply the measurements on a basic model in order to predict, by information redundancy, the state of the tire, which by nature changes slowly. The simplicity of the model allows fast response times and post-processing on board the vehicle. The prediction also improves in terms of reliability by not having to check an excessively large set of sensitive parameters of the vibroacoustic signature of the tire.

Preferably, the method comprises the following step:
determining a tire running speed category, the breadth of which is a fraction of a maximum running speed, preferably the maximum running speed is 300 km/h; and wherein the running speed category is a modality of the machine learning.

In this particular case, the running speed category is added as a modality of the learning database. This allows quicker prediction of the state of wear of the tire since the running speed significantly influences the vibroacoustic response of the tire particularly running at the average level measured over a wide frequency window. This influence is particularly expressed by an increase in the vibroacoustic response of the tire proportional to the running speed. The sensitivity of the representative data can attenuate or disappear in the vibroacoustic response controlled by the average level. Thus, the sensitivity of the data representing the frequency signal is enhanced by taking into account the running speed as a modality, which allows the prediction of the state of wear of the tire to be improved. The speed can be assessed by data derived from the vehicle, such as the information from a GPS (Global Positioning System) or an item of information conveyed over the CANbus of the vehicle or an item of information contained directly or indirectly through electronic systems mounted on the tire, such as a TMS (Tire Mounted Sensor) or TPMS (Tire Pressure Monitoring System) or by any other means. For the sake of the simplicity of the system and due to the sensitivity of the vibroacoustic response of the tire, classifying the speed per speed category is sufficient, preferably a speed category range of approximately ten km/h is a good compromise between the desired assessment speed down to the size of the learning database and the desired precision for the state of wear of the tire. This reduces the learning database for the prediction without excessively affecting the precision. In addition, the change in the state of wear of the tire is slow. For this reason, the information redundancy on the state of wear of the tire results in statistically determining, from a certain number M of vibroacoustic measurements, the state of wear of the tire. The addition of the running speed or of the running speed category makes the process more efficient in terms of the number of vibroacoustic measurements in order to converge toward the good information on the state of wear of the tire.

According to a preferred embodiment, determining the running speed of the vehicle comprises the following steps:
recording a second measurement of a vibroacoustic signal produced by the tire running on the road surface during a second given time frame;
converting the second time signal into a second frequency signal over a second given frequency range;
segmenting the second frequency range into at least one frequency band with a predetermined width and associating at least one datum representing the second frequency signal in said at least one frequency band with the at least one frequency band, with the at least one representative datum derived from the second measurement forming the at least one variable of a matrix associated with said second measurement;
determining a running speed category of the tire corresponding to the matrix associated with the second completed measurement, by means of second machine learning from the data based on a learning database made up of a set of matrices associated with measurements recorded and carried out according to the same steps as above, under known running conditions, according to modalities each representing a running speed category of the tire.

The running speed can be assessed through a vibroacoustic measurement of the tire running on the surface of a road. To this end, the use of second machine learning constructed from a learning database taking into account only the running speed or categories of running speeds as a modality is recommended. Indeed, the vibroacoustic response of the tire depends on the state of wear of the tire but also on other parameters. However, the running speed influences the entire frequency spectrum of the tire and not only certain specific frequency bands or at least these bands are not all identical according to the observed parameters. Thus, the data representing the vibroacoustic signature matrix related to the running speed differs from that of the state of wear of the tire. Consequently, it is possible to identify the running speed or the running speed category corresponding to a vibroacoustic measurement of the tire by means of a specific machine learning step by dividing the frequency signal into specific frequency bands and by assessing particular representative data on each frequency band. This frequency division and its representative data are by nature different from those associated with the identification matrix of the state of wear of the tire. Of course, this second vibroacoustic measurement can differ from the vibroacoustic measurement of the state of wear. However, nothing prevents the same measurement from being used for the two machine learning steps. In this particular embodiment, the running speed or the running speed category need to be identified before determining the state of wear of the tire, which stipulates the order of any post-processing. Finally, dividing the running speed into various speed categories allows the number of modalities to be limited, which makes the method more efficient both in terms of the size of the learning database and the response time of the post-processing. Unlike the document of the prior art, it is possible, from the assessment of the running speed, to take into account a series of representative data, unlike the single datum corresponding to the average power over a given frequency band, which makes this method more reliable in terms of precision and reliability. Thus, the number of measurements required to statistically predict the state of wear of the tire is significantly reduced.

Advantageously, the method comprises the following additional steps:

determining a ground surface state category; and wherein the ground surface state category is a modality of the machine learning or a condition for predicting the state of wear of the tire if it is a specific ground state category.

In this case, the ground surface state category becomes either a modality of the machine learning database related to the state of wear of the tire or a condition for carrying out the step of predicting the state of wear of the tire. In the first case, the ground surface state categories are added as a modality. This has the advantage of statistically accelerating the prediction of the state of wear of the tire by reducing the number of measurements M to be carried out in order to converge toward the useful information. However, the learning database becomes bigger since these new modalities increase the number of combinations between the modalities. Thus, the size of the learning database is increased and the mathematical model associated with the state of wear of the tire becomes more complex. In the second case, the inventor has found that when the ground surface state category is a specific ground state category, determining the state of wear of the tire does not involve knowing the ground surface state category in order to rapidly converge toward the solution. Thus, the ground state category becomes a simple indicator for launching the prediction of the state of wear of the tire. This second case allows the size of the learning database and of the mathematical model of the state of wear of the tire to be limited. However, the number of measurements eligible for the prediction is limited to only those measurements where the condition relating to the specific ground state category is met. This is not detrimental in the case of the state of wear of the tire, which is a parameter that changes slowly over time. Of course, the ground surface state category must be determined before the step of predicting the state of wear of the tire. It is quite possible, but not essential, to combine the use of the ground surface state category with the use of the running speed category in order to further limit the number of measurements necessary to converge toward the information relating to the state of wear of the tire. Finally, this road surface state can be obtained by means of meteorological information related to a map associated with the GPS position of the vehicle or by any other means on a vehicle such as a rain sensor, a windshield wiper actuator, etc.

Specifically, the ground surface state category is included in the group comprising dry, wet, damp, snowy and icy categories.

The state of the ground corresponds to the meteorological conditions of the ground. The meteorological conditions are included in the group comprising: a dry state, a wet state and a damp state or a winter state such as a snow or ice state. A snow state, in a preferred embodiment, can be included in the group comprising a fresh snow state, a compact snow state, a granular snow state and a melted snow state.

A wet state is characterized by a water level flush with the natural roughness of the road surface. This wet state corresponds, for example, to the ground state obtained by a small amount of rainfall or a road that dries after heavy rainfall. A damp state, for its part, is characterized by a water level exceeding the level of the natural roughness of the road surface. In practice, the damp state corresponds to a water level generally ranging between 0.5 millimeters and 1 millimeter.

The meteorological conditions of the ground can be determined by the meteorological forecasts associated with the GPS position of the vehicle, the response of sensors on the vehicle, such as the activation of the windshield wipers or a rain detection sensor on the windshield. Finally, by associating the ambient temperature of the environment in which the vehicle moves, it is possible to identify the presence or the formation of snow associated with a winter state.

Advantageously, the specific ground state category includes the "dry" ground surface state category.

Among the specific meteorological conditions, which prevent the ground state category to be taken as a modality of the machine learning related to the state of wear of the tire, the "dry" ground surface state will refer to the surface for which the contact between the tire and the ground is not affected by the presence of water irrespective of its shape and irrespective of its quantity. The inventor has found that the specific ground state category could also mix the "damp/wet" and "dry" ground surface state categories without detriment to the prediction of the state of wear of the tire by machine learning, although the restriction to the single "dry" ground surface state category improves the probability of the prediction. However, the "damp" ground surface state category preferably should be avoided.

This specific state allows the vibroacoustic measurements taken in dry weather to be selected, irrespective of the ambient temperature, which allows the number of measurements used to predict the state of wear of the tire to be limited, which makes the method more efficient. Indeed, the presence of water modifies part of the obtained frequency spectrum relative to that obtained using a vibroacoustic measurement in dry weather, which naturally creates the dispersion in the frequency spectra and inevitably affects the quality of the prediction.

According to a second embodiment, determining the ground surface state category comprises the following additional steps:

recording a third measurement of a vibroacoustic signal produced by the tire running on the road surface during a given third time frame;

converting the third time signal into a third frequency signal over a third given frequency range;

segmenting the third frequency range into at least one frequency band with a predetermined width and associating at least one datum representing the third frequency signal in said at least one frequency band with the at least one frequency band, with the at least one representative datum derived from the third measurement forming at least one variable of a matrix associated with said third measurement;

determining a ground surface state category corresponding to the matrix associated with the third completed measurement, by means of third machine learning from the data based on a learning database made up of a set of matrices associated with measurements recorded and carried out according to the same steps as above, under known running conditions, according to modalities each representing at least one ground surface state category.

The meteorological conditions of the road surface can be assessed through a vibroacoustic measurement of the tire running on the surface of a road. To this end, third machine learning is used that is constructed from a learning database taking into account the ground state category as a modality. In addition, the running speed category also can be taken into account as a modality of this third machine learning or as a condition of determining the ground surface state in order to reduce the learning database of this third machine learning, which makes identifying the meteorological conditions category of the road surface more efficient. Indeed, the vibroacoustic response of the tire depends on the state of wear of the tire but also on other parameters, such as the running speed. However, the running speed influences the entire frequency spectrum of the tire and not only certain specific frequency bands or at least these bands are not all identical according to the observed parameters. Thus, the data representing the vibroacoustic signature matrix related to the meteorological conditions of the road differs from that of the state of wear of the tire. Consequently, it is possible to identify, by specific machine learning, the category associated with the meteorological conditions of the road corresponding to a vibroacoustic measurement of the tire by dividing the frequency signal into specific frequency bands and assessing particular representative data on each frequency band. This frequency division and its representative data are by nature different from those associated with the identification matrix of the state of wear of the tire and of the running speed. However, having previously identified the running speed category, it is possible to take into account this parameter in order to reduce the learning database of this third machine learning, which makes the method more efficient. Of course, this third vibroacoustic measurement can differ from the vibroacoustic measurement of the state of wear and from the vibroacoustic measurement of the running speed category. However, nothing prevents the use of the same vibroacoustic measurement as either of the measurements respectively associated with the other two machine learning steps, which reduces the number of steps to be carried out.

In this particular embodiment, the surface ground state category needs to be identified before determining the state of wear of the tire, which requires a certain order for the post-processing. However, post-processing of the vibroacoustic measurement associated with the ground state category must be carried out after post-processing of the vibroacoustic measurement of the running speed category in order to take into account this parameter in the third machine learning.

Preferably, the method comprises the following additional steps:

determining a ground nature category; and wherein the ground nature category is a modality of the machine learning or a condition for predicting the state of wear of the tire if it is a specific ground nature category.

In this case, the ground nature category becomes either a modality of the machine learning database related to the state of wear of the tire or a condition of carrying out the step of predicting the state of wear of the tire. In the first case, the ground nature category is added as a modality. This has the advantage of statistically accelerating the prediction of the state of wear of the tire by reducing the number of measurements to be carried out in order to converge toward the useful information. However, the learning database becomes bigger since these new modalities increase the number of combinations between the modalities. Thus, the size of the learning database is increased and the mathematical model associated with the state of wear of the tire becomes more complex. In the second case, the inventor has found that when the ground nature category is a specific ground nature category, determining the state of wear of the tire does not need to involve knowing the ground nature category in order to rapidly converge toward the solution. Thus, the ground nature category becomes a simple indicator for launching the prediction of the state of wear of the tire. This second case allows the size of the learning database and of the mathematical model of the state of wear of the tire to be limited. However, the number of measurements eligible for the prediction is reduced to only those measurements where the condition relating to the specific ground nature category is met. This is not detrimental in the case of the state of wear of the tire, which is a parameter that changes slowly over time. Of course, the ground nature state category must be determined before the step of determining the state of wear of the tire. It is quite possible, but not essential, to combine the use of the ground nature category with the use of the running speed category or the ground surface state category in order to further reduce the number of useful measurements for converging toward the information relating to the state of wear of the tire. Finally, this ground nature state category can be obtained by means of a map of the ground surfaces associated with the GPS position of the vehicle or by any other means such as optical means and/or lights and/or sounds on board a vehicle.

Specifically, the ground nature category is included in the group comprising "open", "medium" and "closed" categories.

A coating is referred to as "closed" or "macro-smooth" when it assumes a smooth appearance and is not rough, such as, for example, a bitumen that becomes damp again after experiencing excessive heat or a concrete plate covered with a layer of cement. A coating will be considered to be "open" or "macro-rough" when the roughness is significant, for example, like those of a worn coating or that of a country road quickly repaired using a surface coating produced by spraying grit onto bitumen. A "medium" coating describes all the coatings in an intermediate state between the two preceding states and more particularly refers to the new coatings.

The macro-texture of a coating acts on the draining properties of the road but also on the acoustic properties of the tire. This texture is characterized by an "Average Texture Depth", also referred to as "ATD". This ATD is measured by the true sand height, also denoted HSv, that is well known to a person skilled in the art.

It is thus possible to categorize the various macro-textures as follows: a coating with a closed macro-texture has an ATD ranging between 0 and 0.4 millimeters. A coating with a medium macro-texture has an ATD ranging between 0.4 and 1.1 millimeters, and a coating with an open macro-texture has an ATD that is greater than 1.1 millimeters.

Preferably, the specific ground nature category comprises the ground nature category referred to as "open".

Among the specific ground nature categories, which allow the ground nature not to be taken as a modality of the machine learning related to the state of wear of the tire, the ground nature category characterized by an "open" macro-texture should be noted. Indeed, the inventor has found that for these ground natures, the frequency spectrum was specific, more easily highlighting significant spectral features of the various modalities other than those associated with the ground nature category.

In addition, this specific ground nature category allows the vibroacoustic measurements made on a fairly open macrotexture ground surface to be selected, which allows the number of measurements eligible for predicting the state of wear of the tire to be limited, which makes the method more efficient.

Very preferably, the specific ground nature category includes ground surfaces with an ATD that is greater than 0.7, preferably greater than 0.9, very preferably greater than 1.0.

However, the inventor has found that the method also could be effective by using ground surface with an ATD of less than 1.1, which amounts to "medium" ground surfaces. However, only the high range of ATD within ground surfaces referred to as "medium" ground surfaces allows efficient implementation of the method as when the ATD is greater than 0.7. Of course, the higher the ATD and the closer it is to the limit of "open" ground surfaces, the more reliable the method.

According to a third embodiment, determining the ground nature category comprises the following additional steps:

recording a fourth measurement of a vibroacoustic signal produced by the tire running on the road surface during a given fourth time frame;

converting the fourth time signal into a fourth frequency signal over a given fourth frequency range;

segmenting the fourth frequency range into at least one frequency band with a predetermined width and associating at least one datum representing the fourth frequency signal in said at least one frequency band with the at least one frequency band, with the at least one representative datum derived from the fourth measurement forming the at least one variable of a matrix associated with said fourth measurement;

determining the ground nature category corresponding to the matrix associated with the fourth completed measurement, by means of fourth machine learning from the data based on a learning database made up of a set of matrices associated with measurements recorded and carried out according to the same steps as above, under known driving conditions, according to modalities each representing at least one ground nature category.

The nature of the road surface can be determined through a vibroacoustic measurement of the tire running on the surface of a road. To this end, the use of fourth machine learning constructed from a learning database taking into account only the ground nature categories as a modality is recommended. Indeed, the vibroacoustic response of the tire depends on the state of wear of the tire but also on other parameters, such as the running speed, the meteorological conditions of the ground. However, the running speed influences the entire frequency spectrum of the tire and not only certain specific frequency bands or at least these bands are not all identical according to the observed parameters. Thus, the data representing the vibroacoustic signature matrix related to the running speed differs from that of the state of wear of the tire or from that of the running speed or from that of the meteorological conditions of the ground. Consequently, it is possible to identify the ground nature or the ground nature category corresponding to a vibroacoustic measurement of the tire by specific machine learning by dividing the frequency signal into specific frequency bands and by assessing particular representative data on each frequency band. This frequency division and its representative data are by nature different from those associated with the identification matrix of the state of wear of the tire, from those associated with the matrix related to the running speed and from those associated with the matrix related to the meteorological conditions of the ground. However, having previously identified the running speed category, it is possible to take this parameter into account in order to reduce the learning database of this fourth machine learning step, which makes the method more efficient. Of course, this fourth vibroacoustic measurement can differ from the vibroacoustic measurement of the state of wear, from the vibroacoustic measurement of the running speed and from the vibroacoustic measurement of the meteorological conditions of the ground. However, nothing prevents the same vibroacoustic measurement from being used for either of the three other vibroacoustic measurements respectively associated with the three other machine learning steps, which reduces the number of steps to be carried out.

In this particular embodiment, the ground nature category needs to be identified before determining the state of wear of the tire, which requires a certain order for any post-processing. However, post-processing of the vibroacoustic measurement associated with the ground nature category can be carried out before or after post-processing of the vibroacoustic measurement of the meteorological conditions of the ground. Furthermore, post-processing of the vibroacoustic measurement associated with the ground nature category may need to be carried out after post-processing the vibroacoustic measurement of the running speed category in order to take into account this parameter in the fourth machine learning.

Optionally, the step of determining the ground nature category comprises the ground surface state category as a modality of the fourth machine learning.

The inventor has found that placing the step of determining the meteorological conditions of the ground before the step of determining the ground nature allows the meteorological conditions of the ground to be taken into account as a modality of the fourth machine learning associated with the ground nature, which allows the prediction associated with this fourth machine learning to be improved. This makes the step of determining the ground nature more efficient by reducing the number of vibroacoustic measurements to be analyzed in order to identify the ground nature.

Advantageously, at least one of the machine learning methods is included in the group comprising neural networks, discriminant analysis, support vector machines, boosting, K-nearest neighbors methods and logistic regression.

There are many machine learning methods and each has advantages and disadvantages. The list provided is not exhaustive and the method will not be limited to these tangible examples of machine learning.

Advantageously, a time signal is converted into a frequency signal using Power Spectral Density.

The inventor has found that using Power Spectral Density to convert the time signal and a frequency signal has the well known advantages of preserving the energy of the signal while reducing the parameters of the frequency signal to a quantity, namely the amplitude, by making the notion of phase disappear.

Preferably, the state of wear of the tire is included in the group comprising new and worn states, preferably also half-worn.

In order to make the method efficient, at least two states of wear of the tire need to be defined, which allows the parameters of the vehicle to be adjusted in accordance with a binary mode. Thus, the life of the tire is split into two periods, a new state and a worn state, for which the behavior of the tire transitions from a first state to a second state, which supports adapting the safety devices, for example, the ABS device (Anti-lock Braking System) according to each of these two states. Of course, it is quite possible for the life of the tire to be split into a greater number of states of the tire. It is then recommended that these states all correspond to the same tread height variation. However, the more the tread of the tire is divided, the more onerous the method, the inventor has found that the best performance/effectiveness compromise of the method involved splitting the tire tread into three states: worn, half-worn and new.

BRIEF DESCRIPTION OF THE DRAWINGS

The invention will be better understood upon reading the following description, which is provided solely by way of a non-limiting example and with reference to the accompanying figures, in which the same reference numbers in all cases designate identical parts and in which.

DETAILED DESCRIPTION OF EMBODIMENTS

Figure 1:
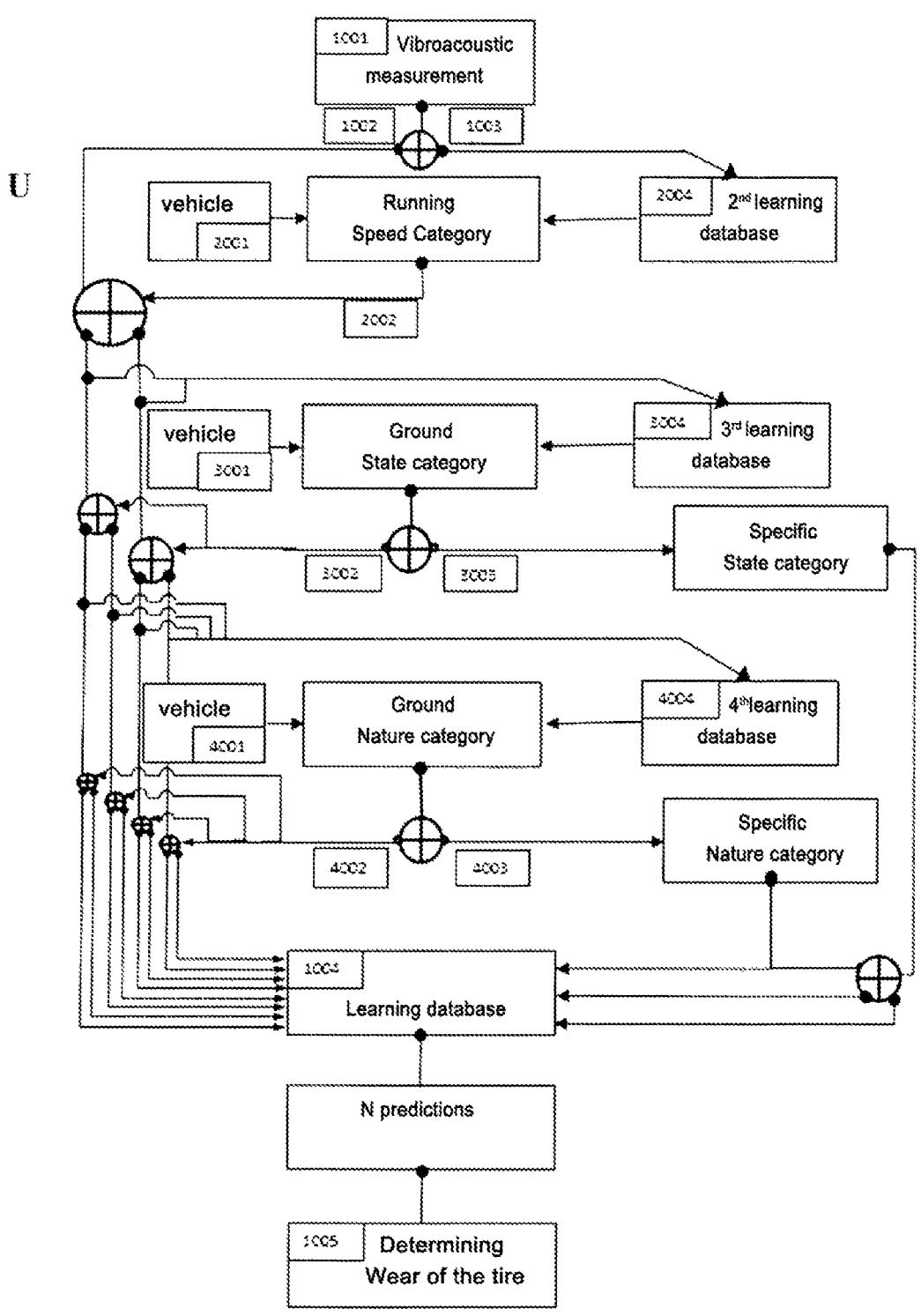
FIG. 1 shows a general overview of the method for estimating the state of wear of a tire according to the invention.

FIG. 1 shows a complete overview of the method for estimating the state of wear of a tire using a vibroacoustic measurement 1001 carried out on a vehicle when running, according to several embodiments.

This temporal measurement 1001 is converted into a frequency spectrum 1002 using standard computation tools such as Fast Fourier Transform.

The frequency spectrum 1002 is then divided into different frequency bands in accordance with the selected use. On each frequency band, one or more physical quantities of the reduced frequency spectrum is/are associated with the frequency spectrum on the frequency band. The set of quantities forms a vector, the length of which is proportional to the number of computed physical quantities. This allows a matrix 1003 to be filled, one of the dimensions of which is the number of frequency bands obtained from the full width of the frequency spectrum. The second dimension of the matrix 1003 corresponds to the maximum number of physical quantities assessed per selected frequency band. Generally, the matrix is a vector, the length of which is the number of selected frequency bands and the second dimension is a scalar dimension. This also can be a two-dimensional matrix or the second dimension is a vector.

In a first embodiment, the matrix 1003 is introduced into machine learning 1004 comprising a learning database. The learning database was formed during a prior step of learning by a series of vibroacoustic measurements and of frequency processing on the temporal measurement where the modalities of the learning database were managed. In a conventional embodiment, the modalities are the state of wear categories of the tire comprising at least the worn state and the new state, preferably also the half-worn state. The machine learning provides a prediction of the state of wear of the tire.

Repeating the measurements, post-processing and predictions allows a series M of prediction results to be formed. Regularly repeating the same result in the series allows the change of the state of wear of the tire to be confirmed. In addition, generally, the initial state of wear of the tire is the new state, which transforms over time and as such changes the prediction series to the half-worn state and then to the worn state. Thus, the redundancy of the prediction results on the same state of wear, knowing that the change in the state of wear can only occur in one direction, generally allows the actual state of wear of the tire to be quickly determined in the form of a state of wear category. The higher the number of wear categories, resulting in greater precision in determining the state of wear of the tire, the less efficient the method since the quality of the result of the prediction will be affected by all the influential parameters other than the state of wear of the tire. For example, the running speed, the ground nature, the meteorological conditions of the ground, but also, the vehicle, the operating conditions of the tire in terms of pressure, of applied load, of outside temperature, etc., can be cited.

According to a second embodiment, in order to make the method for estimating the state of wear of the tire more reliable, the prediction by the machine learning 1004 can also take into account the running speed of the tire 2001. Indeed, this parameter significantly influences the average level of the frequency spectrum 1002 obtained from the temporal vibroacoustic measurement 1001. Taking into account this parameter in the form of running speed categories as a modality of the machine learning allows incorrect predictions to be reduced.

This running speed of the tire can be obtained by additional sensors of the vehicle or obtained through information passing through the electronic wiring of the vehicle. This determination can occur directly in the form of categories or can be stored in the form of running speed categories preferred by the machine learning. However, in a variant, the running speed category 2002 is determined using a second vibroacoustic measurement 1001 obtained on the vehicle. This second vibroacoustic measurement 1001 is advantageously the vibroacoustic measurement 1001 that will be used for predicting the state of wear of the tire in step 1004.

As before, the temporal vibroacoustic measurement 1001 is converted into a frequency spectrum 1002. This frequency spectrum is then divided into frequency bands. One or more physical quantities of the frequency spectrum is/are associated with each frequency band. This allows a matrix 1003 to be completed that is associated with the prediction of the running speed category. However, the division into a frequency band does not need to be similar to that carried out for predicting 1004 the state of wear of the tire. The identification of the speed category 2002 is largely sufficient for predicting 1004 the state of wear of the tire.

Optionally, it is also possible to determine the meteorological surface state 3001 of the ground where the vehicle is traveling in order to make the method for estimating the state of wear of the tire more reliable, the prediction by the machine learning 1004 can also take into account these meteorological conditions in accordance with two distinct routes.

The first route involves determining categories 3002 of the state of the ground and taking into account these categories of the state of the ground as a modality of the prediction 1004 of the state of wear of the tire. Knowing the meteorological ground surface state, at least in terms of categories, allows the prediction to be made more reliable, to the detriment of a larger learning database and of a more complex mathematical model.

The second route involves determining a specific ground state category 3003, for which the prediction of the state of wear of the tire will be carried out. In fact, from among all the vibroacoustic measurements 1001 the ones selected are those that correspond to a state of the ground promoting the prediction 1004 of the state of wear of the tire. Thus, the learning database associated with the prediction is reduced and the mathematical model is more basic, which allows fast computation times with limited resources and reliable prediction.

The meteorological surface state 3001 of the ground is separated into various categories. In summer or normal conditions, at least the dry state, the wet/damp state are distinguished, and the second group is even separated according to the water level on the road. This can also include the winter conditions, such as the icy state or the snowy state.

The applicant has found that the specific ground state category must include the "dry" state. Indeed, this ground state category has a high occurrence in the vibroacoustic measurements 2001 and can be more reproducible for division into a frequency band in step 1003. Thus, focusing on the vibroacoustic measurements where the ground state category is specific is not detrimental in terms of the occurrence of the vibroacoustic measurements 1001 in a large majority of territories, while being efficient in terms of prediction due to the similarity of the frequency spectra 1002 for these meteorological conditions.

Of course, taking into account the ground state categories in this way can occur with or without taking into account the running speed 2001 in the machine learning step 1004. However, determining the ground state category 3002 will necessarily occur after determining the speed category 2002 if the intention is to take everything into account.

Finally, the meteorological conditions of the ground 3001 can be obtained by additional sensors of the vehicle, such as a rain detector on the windshield, or the actuator of the trigger of the windshield wipers or obtained through the information passing through the electronic wiring of the vehicle. However, in a variant, the ground state category 3002 is determined using a third vibroacoustic measurement 1001 obtained on the vehicle. This third vibroacoustic measurement 1001 is advantageously the vibroacoustic measurement 1001 that will be used for predicting 1004 the state of wear of the tire and/or the vibroacoustic measurement 1004 that was used to determine 2004 the running speed category 2002.

As before, the temporal vibroacoustic measurement 1001 is converted into a frequency spectrum 1002. This frequency spectrum is then divided into frequency bands. One or more physical quantities of the frequency spectrum is/are associated with each frequency band. This allows a matrix 1003 to be completed that is associated with determining the meteorological conditions category 3002 of the ground. However, the division into a frequency band does not need to be similar to that carried out for predicting 1004 the state of wear of the tire or for determining the running speed category 2002. In fact, the identification of the ground state category 3002 is largely sufficient for predicting 1004 the state of wear of the tire.

Optionally, it is also possible to determine the nature 4001 of the texture of the ground where the vehicle travels in order to make the method for estimating the state of wear of the tire more reliable, the prediction by the machine learning 1004 can also take into account ground nature categories in accordance with two distinct routes.

The first route involves determining ground nature categories 4002 and taking into account these categories of the ground nature as a modality of the prediction 1004 of the state of wear of the tire. Knowing the ground nature 4001, at least in terms of categories, allows the prediction 1004 to be made more reliable, to the detriment of a larger learning database and of a more complex mathematical model.

The second route involves determining a specific ground nature category 4003, for which the prediction 1004 of the state of wear of the tire will be carried out. In fact, from among all the vibroacoustic measurements 1001 the ones selected are those that correspond to a ground nature promoting the prediction 1004 of the state of wear of the tire. Thus, the learning database associated with the prediction is reduced and the mathematical model is more basic, which allows fast computation times with limited resources and a reliable prediction.

The ground nature 4001 is separated into various categories according to the roughness on a millimetric scale. This ground nature is characterized by the ATD.

The applicant has found that the specific ground nature category must include ground surfaces referred to as "open" ground surfaces. Indeed, this category allows more reproducibility with respect to the frequency band division of step 1003. Thus, focusing on the vibroacoustic measurements where the ground nature category is specific is efficient in terms of prediction due to a certain similarity of the frequency spectra 1002. However, it is quite possible to extend the specific ground nature category to all ground surfaces having an ATD of more than 0.7, which also covers the upper part, made of ATD material, of the ground surfaces referred to as "medium" ground surfaces.

Of course, the ground nature categories can be taken into account with or without taking into account the running speed 2001 or the surface state 3001 in the machine learning 1004. However, taking into account the ground nature category will necessarily occur after determining the speed category 2002 if the intention is to take into account these two parameters.

Finally, the ground nature 4001 can be obtained by additional sensors of the vehicle, such as laser or sound measurement devices or obtained through the information passing through the electronic wiring of the vehicle. However, in a variant, the ground nature category 4002 is determined using a fourth vibroacoustic measurement 1001 obtained on the vehicle. This fourth vibroacoustic measurement 1001 is advantageously the vibroacoustic measurement 1001 that will be used for predicting the state of wear of the tire in step 1004 and/or the vibroacoustic measurement 1001 used for determining the running speed category

2002 and/or the vibroacoustic measurement 1001 used for determining the ground state category 3002.

As before, the temporal vibroacoustic measurement 1001 is converted into a frequency spectrum 1002. This frequency spectrum is then divided into frequency bands. One or more physical quantities of the frequency spectrum is/are associated with each frequency band. This allows a matrix 1003 to be completed that is associated with determining 4002 the ground nature category 3002. However, the division into a frequency band does not need to be similar to that carried out for predicting 1004 the state of wear of the tire or for determining the running speed category 2002 or for determining the ground state category 3002. In fact, the identification of the ground state category 3002 is largely sufficient for predicting 1004 the state of wear of the tire.

Finally, the applicant has found that taking into account the meteorological conditions and then the ground nature allows the prediction 1004 of the state of wear of the tire to be made more reliable. Indeed, the separating power of the ground state category is stronger than the separating power of the ground nature category.

In conclusion, optionally taking into account the ground state category 3002 and the ground nature category 4002 allows the prediction to be made more reliable. The combination is the most efficient configuration in the aforementioned order. The efficiency is measured by the error rate of the prediction.

However, by taking the specific categories route, the method becomes more efficient due to the reduced size of the learning database of the prediction 1004 of the state of wear of the tire and the speed and simplicity of the computations that can be carried out on board the vehicle and in real time.

Figure 2:
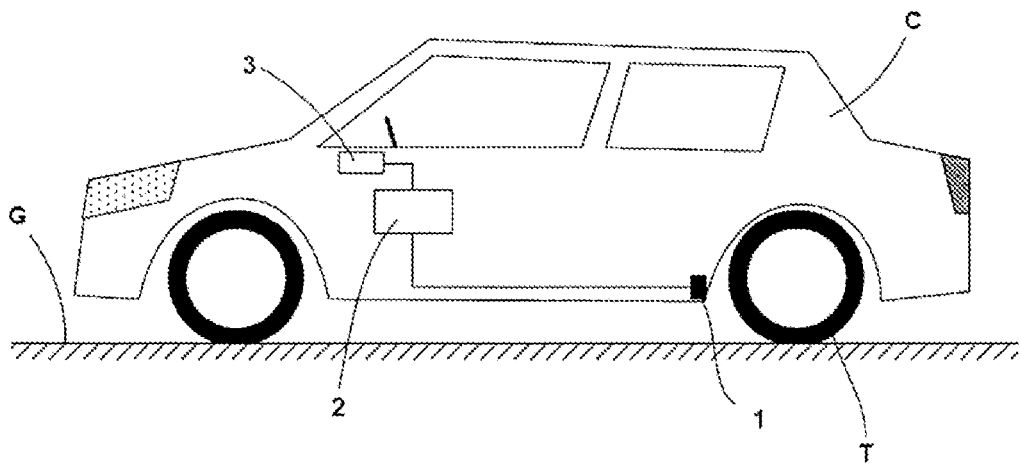
FIG. 2 shows a vehicle equipped with a measuring device allowing the state of wear of the tire to be determined.

In the main embodiment, the sound signal generated by the tire (T) is measured using a microphone (1) placed in the vehicle. In FIG. 2, the microphone is placed in the front part of a wheel housing located at the rear of the vehicle (C). However, other locations such as, for example, the rear bumper, can be contemplated. The selection of the location for the microphone depends, for example, on the type of data to be estimated, the type of vehicle and the external constraints related to its installation, to its maintenance, and to its durability.

FIG. 2 shows a vehicle C traveling on a ground surface G, shown schematically, comprising front and rear wheel housings, in which the wheels fitted with tires T are housed.

When the vehicle C moves, the tire T generates a noise, the amplitude and frequency of which depend on many factors. This sound pressure is in fact the superposition of noises from various origins, such as noises generated by tread pattern elements coming into contact with the ground G, by the movements of air between the tread pattern elements, by the water particles lifted by the tire, or even by the air flows associated with the speed of the vehicle. Listening for these noises is also superimposed with the noises associated with the environment of the vehicle, such as the engine noise. All these noises are also dependent on the speed of the vehicle.

A measurement means, such as a microphone 1, is installed in the vehicle. It should be noted herein that various positions can be contemplated for the measurement means, with only one being shown in FIG. 1, but without limiting the scope of the invention to this configuration. Thus, the sensor can be positioned on a wall of the rear bumper, for example, but not necessarily oriented so as to detect a sound signal originating from the rear of the vehicle.

It is also possible to contemplate a position on a wall of the front bumper of a vehicle. The measurement means also can be positioned in a wheel housing in order to listen for the running noises as close as possible to the site where they are generated. Ideally, installing a vibroacoustic sensor in each of the wheel housings can be considered to be the best means of detecting all the noises and running vibrations generated by the tires. However, in order to determine the ground state (meteorological conditions) and the ground nature (macrotexture of the coating), a single microphone is sufficient. In this latter case, isolating it from the aerodynamic and engine noises is preferable.

Of course, the operating precautions are taken in order to protect the measurement means from external aggressions such as projections of water, mud or gravel.

The vehicle also comprises a computer 2, connected to the measurement means, and configured to execute the operations for shaping and analyzing, as will be described in detail hereafter, the raw information derived from the measurement means, and to estimate the state of the tire as a function of a measurement of the vibroacoustic emission detected by the measurement means.

Figure 3:
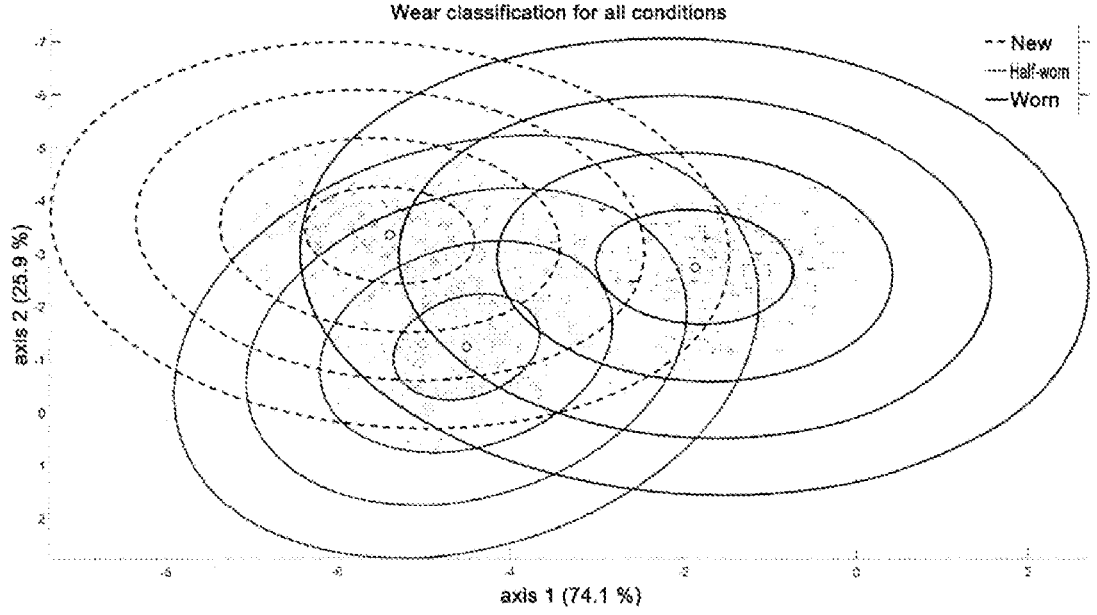
FIG. 3 shows a discriminant space along two main axes of the method for estimating the state of wear of the tire taking into account only the modalities of the state of wear of the tire according to the invention.

FIG. 3 is a view showing the state of wear of the tire distributed in three identical size categories for vehicle running speeds ranging between 20 and 130 km/h. The first category is the "new" wear category corresponding to an upper third of the useful height of the tire tread. The useful height is delimited by the maximum height of the tread corresponding to the radially external end of the tire relative to its natural axis of rotation and the minimum height is defined by the radially external end of the wear indicator at the bottom of the groove. The second category, referred to as the "half-worn" category, corresponds to the middle third of the useful height of the tire tread. Finally, the last category, referred to as the "worn" category, corresponds to the lower third of the useful height of the tread.

Herein, a set of vibroacoustic measurements carried out on a vehicle is displayed irrespective of the conditions of the vehicle in terms of applied load and inflation pressure starting from the nominal vehicle configuration. The vehicle has followed a road circuit comprising an urban route, a route on a country road and a highway route over several sessions in an intermediate season, which allows all the conditions of the ground surface state to be mixed, in particular the "dry", "wet" and "damp" ground states and on various types of ground surface nature, in particular "closed", "medium" and "open" ground surface natures. The learning database takes into account the state of wear of the tire as a modality. The measurements are taken in this case with tires that have the three types of state of wear of the tire.

Machine learning relative to its conditions mathematically defines main directions. FIG. 3 shows the discriminant space in the two first main directions that represent the two axes of representation of the graph. The machine learning identifies three series of circles in this two-dimensional representation. The first series, represented by dashed circles, represents the various probabilities of the "new" state of wear in this two-dimensional discriminant space. The circles are concentric. The highest probability, i.e., greater than 0.9, is defined by the surface delimited by the smallest circle. Then, the following circle defines a degressive probability of 0.1, that is a value of 0.8. Furthermore, the following circle represents a probability that has further decreased by 0.1, that is a value of 0.7. The second series of circles represented by circles as a grey solid line represents the various probabilities of the "half-worn" state of wear in this two-dimensional discriminant space. Finally, the third series of circles represented by circles as a black solid line in the same way represents the various probabilities of the "worn" state of wear. It should be noted that the three series of circles are generally separate, in particular in the vicinity of their small circle, referred to as the main circle, which allows the measurements to be sorted according to the three states of wear. However, the circles are big and the secondary circles mutually overlap. As a result, there is uncertainty with respect to the prediction that has been made. It is possible for an incorrect prediction to be made. Thus, by statistically multiplying the measurements, incorrect predictions are minimized in all the predictions, which allows the state of wear of the tire to be determined. In this configuration, the series of predictions N that identified the same state of wear needs to be large in a series M of significant predictions. In this case, a point symbol is assigned to each measurement. The round "o" symbol represents a measurement, the prediction of which indicates a tire with intermediate wear. The plus "+" symbol represents a measurement for which the prediction indicates a severely worn tire. Finally, the cross "x" symbol represents a measurement for which the prediction indicates a tire in the practically new state.

Figure 4:
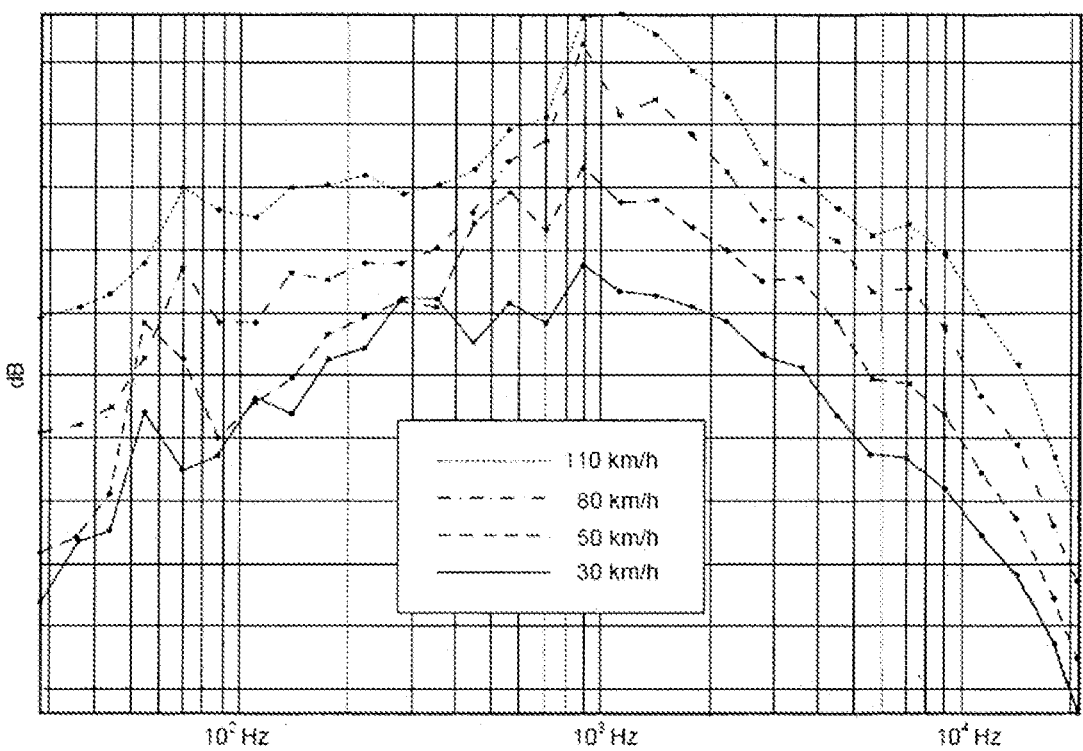
FIG. 4 shows noise spectra measured on a vehicle travelling on a road, for which the state and ground nature surface are known.

FIG. 4 is a spectral representation of the sound power recorded by the microphone during a time frame. The term "time frame" is understood herein to mean the time interval, which is generally short, during which a recording is carried out, on the basis of which the data used as the basis for a measurement are established. This time frame is less than or equal to 0.5 seconds or ideally is less than or equal to 0.25 seconds.

This spectral representation represents the received sound power (in dB) as a function of the frequency, over a given frequency range, typically in this case, the audible frequency range, ranges between 0 Hz and 20 KHz.

More specifically, the spectral representation of FIG. 4 is obtained by decomposing the frequency range into frequency bands with predetermined widths, and by assigning a characteristic value to each frequency band that is equal to the average power measured in this frequency band. In this case, dividing the frequency range as one-third octave bands was used. Thus, each point of each of the curves of FIG. 4 represents an average sound power for a frequency band given and measured during a time frame under running conditions, in which, all other things being equal, only the running speed is varied (typically from 30 km/h to 110 km/h).

It then can be seen that the curves representing the spectral powers are offset relative to one another, and that the total dissipated sound power increases as a function of the speed. Although the general shape of the curves remains similar, which supports the fact that this parameter does not systematically subvert the prediction of the state of wear, certain specific features of the spectrum are more or less marked, which generates noise in the prediction constructed on its spectra. Taking into account the running speed, in particular in terms of a speed category of approximately 30 km/h, allows the prediction of the state of wear of the tire to be improved according to a second embodiment of the invention.

These observations are reproduced when one or more modalities of the other categories is/are changed and the curves obtained are compared by only varying the speed parameter.

Figure 5:
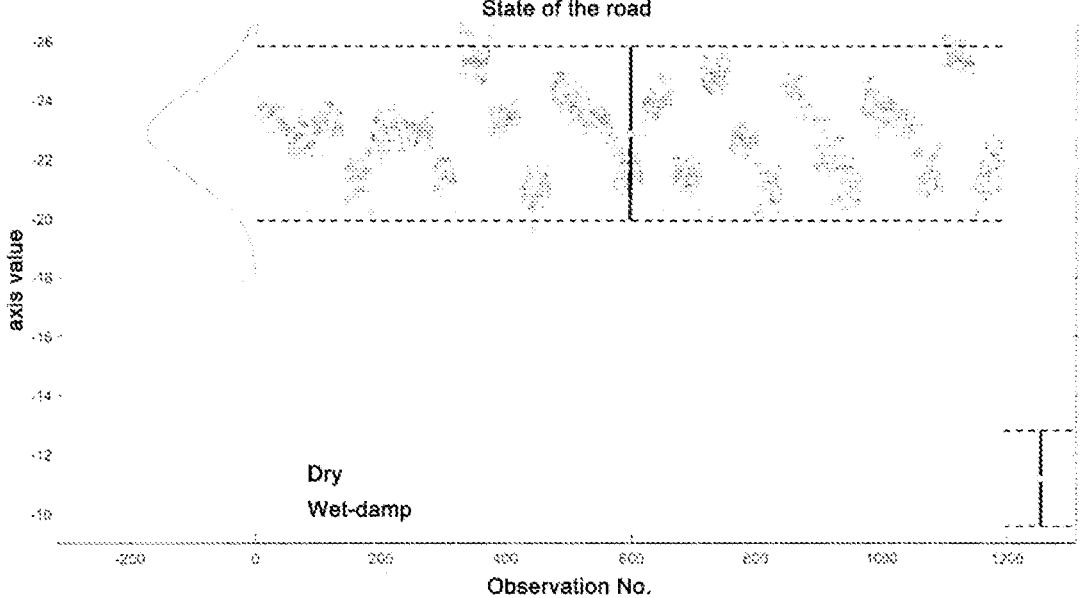
FIG. 5 shows a discriminant space along a main axis of the method for determining the ground surface state category taking into account only the modality related to the ground surface state according to the invention.

FIG. 5 is a two-dimensional representation of a series of measurements made on a vehicle for the same tire train, irrespective of its state of wear and irrespective of its operating conditions on a vehicle when traveling on various roads. However, some measurements were taken on wet or damp ground that attest to the activation of the windshield wipers of the vehicle. However, no measurement of the water level on the roads was recorded, these measurements are classified as two unique categories: dry and wet/damp.

FIG. 5 highlights the efficiency of the third machine learning step of the method for determining the ground surface state, in the form of a category, on the basis of a vibroacoustic temporal measurement. In a discriminant space, in this case in a representation through the single main vector, the measurements are easily classified according to the two aforementioned modalities. The graph represents, for a set of measurements indexed from 1 to 1,290 along the first axis of the graph and stored as the windshield wiper activation indicator, the norm of the main vector along the vertical axis of the graph. The two ground state categories are easily distinguished, forming two groups of measurements, for which the values of the norm of the main vector are significantly differentiated. In addition, a notion of Gaussian distribution of the measurements is found around a central value for each group. Thus, the discriminant power of the vibroacoustic measurement according to the third machine learning is confirmed on a main vector derived from the vibroacoustic measurement on a vehicle. Although some points are aberrant, their limited number easily leads to the meteorological conditions of the ground where the vehicle circulates being determined with low measurement redundancy. The other solution involves not taking into account these aberrant points, since uncertainty remains, and in re-initiating a method for estimating the state of wear of the tire.

Figure 6:
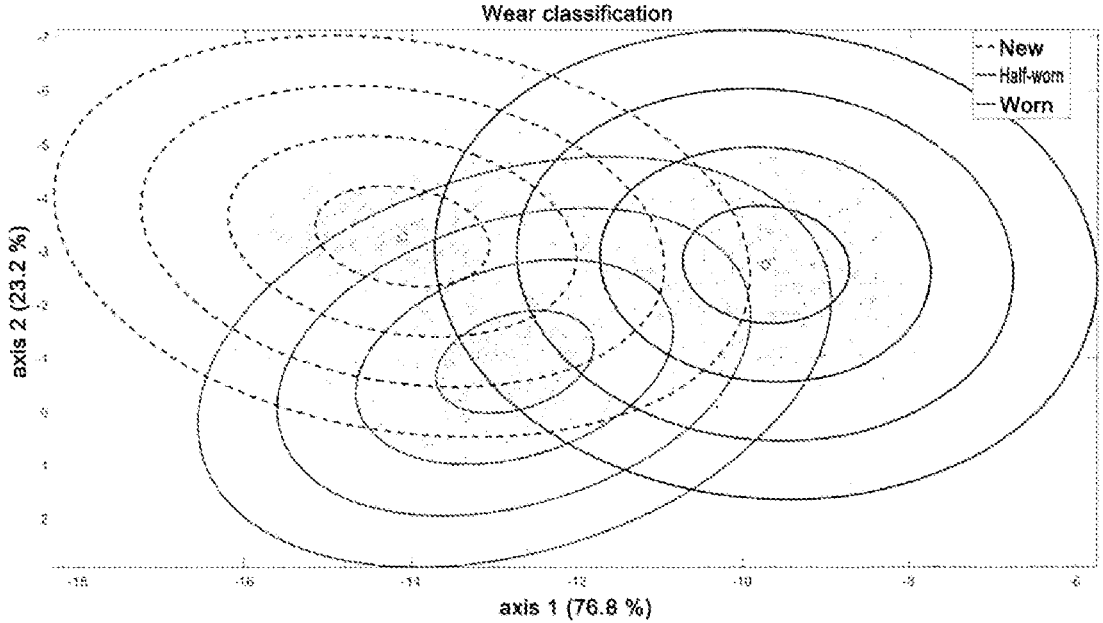
FIG. 6 shows a discriminant space along two main axes of the method for estimating the state of wear of the tire taking into account the modalities of the state of wear of the tire and the running speed categories for a specific ground state category, namely the "dry" state, according to the invention.

FIG. 6 is a view according to the state of wear of the tire distributed as three categories of identical size, the "new" category, the "half-worn" category and the "worn" category, for vehicle running speeds ranging between 20 and 130 km/h.

In this case, a set of vibroacoustic measurements carried out on a vehicle is displayed irrespective of the conditions of the vehicle in terms of applied load and inflation pressure starting from the nominal vehicle configuration. The vehicle has followed a road circuit comprising an urban route, a route on a country road and a highway route over several sessions in an intermediate season, which allows all the conditions of the ground surface state to be mixed, in particular the "dry", "wet" and "damp" ground states and on various types of ground surface nature, in particular "closed", "medium" and "open" ground surface natures. The learning database takes into account the state of wear of the tire as a modality, but also the running speed category of the vehicle. The measurements are taken in this case with tires that have the three types of state of wear of the tire. However, a condition for carrying out the prediction of the state of wear of the tire is put in place on the ground surface state through the specific ground state category corresponding to the "dry" ground state category. Thus, if the ground surface state does not correspond to the specific ground state category, the prediction of the state of wear of the tire by the machine learning is not carried out. This excludes a number of vibroacoustic measurements but the occurrence of the measurements on a vehicle is sufficient relative to the slow temporal evolution of the wear of the tire.

Machine learning relative to its conditions mathematically defines main directions. FIG. 6 shows the discriminant space along the two first main directions that represent the two axes of representation of the graph. The machine learning identifies three series of circles in this two-dimensional representation. The first series, represented by dashed circles, represents the various probabilities of the "new"

state of wear. The circles are mutually concentric in this two-dimensional discriminant space. The highest probability, i.e., greater than 0.9, is defined by the surface delimited by the smallest circle. Then, the following circle defines a degressive probability of 0.1, that is a value of 0.8. Furthermore, the following circle represents a probability that has further decreased by 0.1, that is a value of 0.7. The second series of circles represented by circles as a grey solid line represents the various probabilities of the "half-worn" state of wear in this two-dimensional discriminant space. Finally, the third series of circles represented by circles as a black solid line in the same way represents the various probabilities of the "worn" state of wear. It should be noted that the three series of circles are generally separate, more than those of FIG. 3, in particular in the vicinity of their small circle, referred to as the main circle, which allows the measurements to be more efficiently sorted according to the three states of wear. However, the circles are big and the secondary circles mutually overlap. As a result, there is uncertainty with respect to the prediction that has been made. It is possible for an incorrect prediction to be made. Thus, by statistically multiplying the measurements, incorrect predictions are minimized in all the predictions, which allows the state of wear of the tire to be determined. In this case, excluding a certain number of vibroacoustic measurements due to the ground surface category makes the method more reliable by minimizing incorrect predictions. In this configuration, the series of predictions N that identified the same state of wear needs to be large in a series M of significant predictions. In this case, a point symbol is assigned to each measurement. The round "o" symbol represents a measurement, the prediction of which indicates a tire with intermediate wear. The plus "+" symbol represents a measurement for which the prediction indicates a severely worn tire. Finally, the cross "x" symbol represents a measurement for which the prediction indicates a tire in the practically new state.

Figure 7:
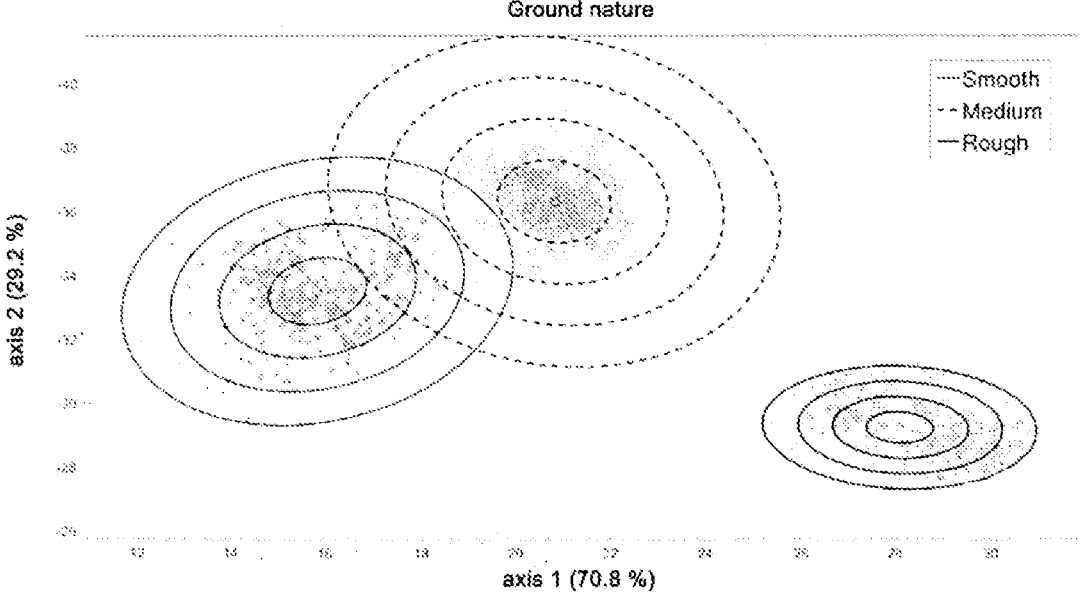
FIG. 7 shows a discriminant space along two main axes of the method for determining the ground nature category according to the invention.

FIG. 7 is a two-dimensional representation of a series of measurements made on a vehicle for the same tire train, irrespective of its state of wear and irrespective of its operating conditions on a vehicle when traveling on various roads, with this being irrespective of the meteorological conditions. The routes taken are vehicle test tracks, for which the coating texture is regularly monitored by an ATD type measurement. The fourth machine learning, by taking into account only the modalities associated with the three ground nature categories, "open", "medium" and "closed", defines main directions characterized by vectors. In this case, the discriminant space is represented using the two main vectors to dimensionally represent the discriminant space.

The fourth machine learning identifies three series of circles in this two-dimensional representation in association with each of the modalities. The first series, represented by dashed circles, represents the various probabilities of the "medium" ground nature. The circles are mutually concentric in this two-dimensional discriminant space. The highest probability, i.e., greater than 0.9, is defined by the surface delimited by the smallest circle. Then, the following circle defines a degressive probability of 0.1, that is a value of 0.8. Furthermore, the following circle represents a probability that has further decreased by 0.1, that is a value of 0.7. The second series of circles represented by circles as a grey solid line represents the various probabilities of the "closed or smooth" ground nature in this two-dimensional discriminant space. Finally, the third series of circles represented by circles as a black solid line in the same way represents the various probabilities of the "open or macro-rough" ground nature. It should be noted that the three series of circles are generally separate, perfectly between the "open" and "closed" categories, and at least at their smallest circle, called main circle, which allows the measurements to be sorted according to the three ground natures. However, uncertainty remains with respect to the prediction that has been made. It is possible for an incorrect prediction to be made. Thus, by statistically multiplying the measurements, incorrect predictions are minimized in all the predictions, which allows the ground nature to be determined according to the three aforementioned categories. In this case, excluding a certain number of vibroacoustic measurements due to the ground state category makes the method more reliable by minimizing incorrect predictions. In this configuration, the series of predictions N that identified the same state of wear needs to be large in a series M of significant predictions. In this case, a point symbol is assigned to each measurement. The round "o" symbol represents a measurement, the prediction of which indicates a ground surface for which the nature would be of the medium type. The plus "+" symbol represents a measurement for which the prediction indicates a smooth or closed type ground surface. Finally, the cross "x" symbol represents a measurement for which the prediction indicates a macro-rough or open type ground surface.

FIG. 7 highlights the efficiency of the fourth machine learning of the method for determining the ground nature on the basis of a vibroacoustic temporal measurement. In the discriminant space, in this case in a representation taking into account the two main directions, the measurements are easily classified according to the three aforementioned modalities. The three ground nature categories are identified by the machine learning and are easily distinguished, forming three groups of measurements, for which the values of the norm of the main vectors are significantly differentiated, in particular for the first vector. Thus, the discriminant power of the vibroacoustic measurement according to the fourth machine learning is confirmed by this two-dimensional representation derived from the vibroacoustic measurement on a vehicle. Although some points are aberrant, their limited number easily leads to the texture of the ground where the vehicle circulates being determined with low measurement redundancy.

Figure 8:
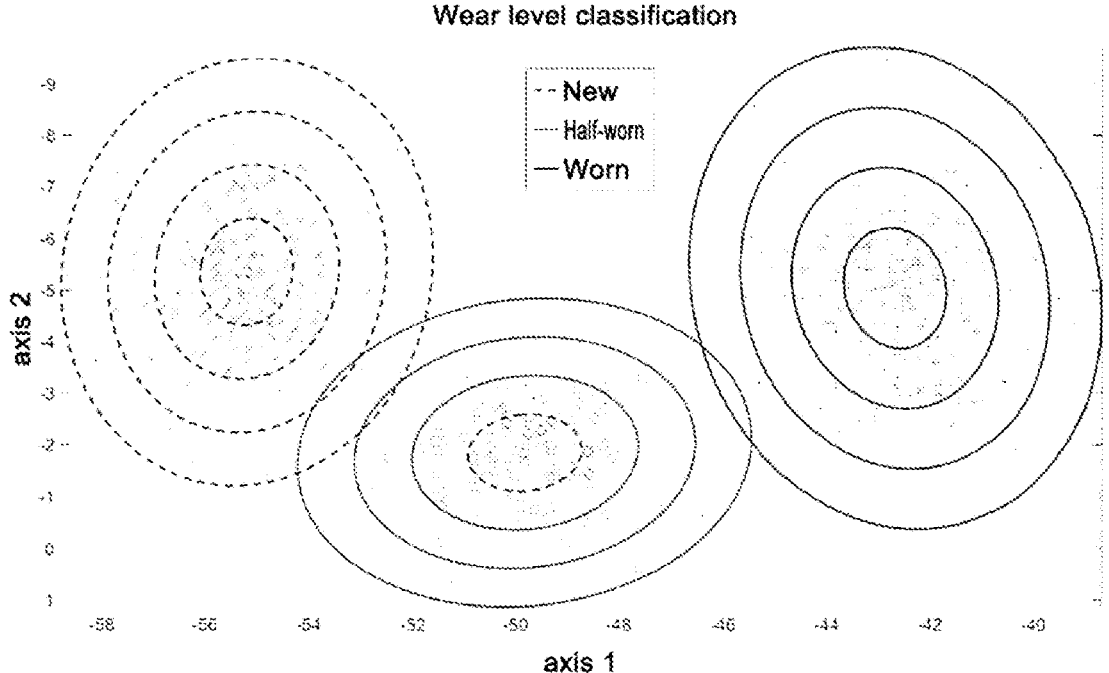
FIG. 8 shows a discriminant space along two main axes of the method for estimating the state of wear of the tire by selecting the measurements according to the specific ground state category and the specific ground nature category criteria.

FIG. 8 is a view according to the state of wear of the tire distributed as three categories of identical size, the "new" category, the "half-worn" category and the "worn" category, for vehicle running speeds ranging between 20 and 130 km/h.

In this case, a set of vibroacoustic measurements carried out on a vehicle is displayed irrespective of the conditions of the vehicle in terms of applied load and inflation pressure starting from the nominal vehicle configuration. The vehicle has followed a road circuit comprising an urban route, a route on a country road and a highway route over several sessions in an intermediate season, which allows all the conditions of the ground surface state to be mixed, in particular the "dry", "wet" and "damp" ground states and on various types of ground surface nature, in particular "closed", "medium" and "open" ground surface natures. The learning database takes into account the state of wear of the tire as a modality, but also the running speed category of the tire. The measurements are taken in this case with tires that have the three types of state of wear of the tire. However, two conditions for carrying out the prediction of the state of wear of the tire are required before undertaking the prediction, one on the ground surface state and the other on the ground nature. Thus, if the ground surface state does not correspond to the specific ground state category, the prediction on the state of wear of the tire by the machine learning step is not carried out. Similarly, if the ground nature does not correspond to the specific ground nature category, which has an ATD higher than 0.7, the prediction of the state of wear of the tire by the machine learning is not carried out. This excludes a number of vibroacoustic measurements but the occurrence of the measurements on a vehicle is sufficient relative to the slow temporal evolution of the wear of the tire.

Machine learning relative to its conditions mathematically defines main directions. FIG. 8 shows the discriminant space in the two first main directions that represent the two axes of representation of the graph. The machine learning identifies three series of circles in this two-dimensional representation. The first series, represented by dashed circles, represents the various probabilities of the "new" state of wear. The circles are mutually concentric in this two-dimensional discriminant space. The highest probability, i.e., greater than 0.9, is defined by the inner surface delimited by the smallest circle. Then, the following circle defines a degressive probability of 0.1, that is a value of 0.8. Furthermore, the following circle represents a probability that has further decreased by 0.1, that is a value of 0.7. The second series of circles represented by circles as a grey solid line represents the various probabilities of the "half-worn" state of wear in this two-dimensional discriminant space. Finally, the third series of circles represented by circles as a black solid line in the same way represents the various probabilities of the "worn" state of wear. It should be noted that the three series of circles are generally separate, more than those of FIG. 3 and of FIG. 6, in particular in the vicinity of their small circle, referred to as the main circle, which allows the measurements to be more efficiently sorted according to the three states of wear. As a result, there is low uncertainty with respect to the prediction that has been made. It is possible for an incorrect prediction to be made. Thus, by statistically multiplying the measurements, incorrect predictions are minimized in all the predictions, which allows the state of wear of the tire to be determined. In this case, excluding a certain number of vibroacoustic measurements due to the ground surface category and the ground nature category makes the method more reliable by minimizing incorrect predictions. In this configuration, the series of predictions N that identified the same state of wear needs to be large in a series M of consecutive predictions in order to determine the state of wear. In this case, a point symbol is assigned to each measurement. The round "o" symbol represents a measurement, the prediction of which indicates a tire with intermediate wear. The plus "+" symbol represents a measurement for which the prediction indicates a severely worn tire. Finally, the cross "x" symbol represents a measurement for which the prediction indicates a tire in the practically new state. No incorrect sorting is identified in this example. Finally, selecting "specific" categories in terms of conditions for carrying out the prediction allows the computation times and the computation resources required with machine learning to be limited, taking into account all these categories as a modality of the machine learning. This amounts to minimizing the learning database to only those modalities retained by the machine learning. In addition, this supports the low cost use of the method for estimating the state of wear of the tire on board a vehicle and in real time.

The applicant has found that taking into account a specific running speed category also improves the quality of the prediction of the state of wear of the tire. However, the gain in terms of prediction quality is counterbalanced by the occurrence of the vibroacoustic measurements at least to define a broad specific running speed category.

Of course, between the method described in FIG. 3 and the method described in FIG. 8, there are several possible variants relating to the role of a category by alternating both between the selection between a modality of the machine learning or a condition for carrying out the automatic prediction by defining specific categories.

The invention claimed is:

1. A method for estimating a state of wear of a tire of a mounted assembly of a vehicle traveling on a road surface, comprising the following steps:

installing a vibroacoustic sensor in a wheel housing of the tire to detect noises and running vibrations generated by the tire;

performing a learning campaign including:

selecting a specific vehicle with a known tire assembly, including a level of wear of a tire of the known tire assembly according to multiple pressure and static load conditions of the known tire assembly having nominal conditions; and running the specific vehicle on a predetermined road having known meteorological conditions;

obtaining matrices associated with a vibroacoustic signature during performance of the learning campaign;

measuring, during a measuring step, a vibroacoustic signal produced by the tire running on the road surface during a given time frame to obtain a completed measurement and a time signal;

converting, during a converting step, the time signal into a frequency signal over a frequency range;

segmenting, during a segmenting step, the frequency range into at least one frequency band with a predetermined width and associating at least one datum representing the frequency signal in the at least one frequency band with the at least one frequency band, with the at least one representative datum derived from the measurement forming at least one variable of a matrix associated with the completed measurement;

predicting the state of wear of the tire corresponding to the matrix associated with the completed measurement, by performing machine learning from data based on a learning database made up of a set of matrices associated with measurements recorded and carried out according to the measuring step, the converting step, and the segmenting step, under known running conditions, according to modalities each representing a state of wear of the tire;

determining a ground surface state category, where the ground surface state category is a condition for predicting the state of wear of the tire by the machine learning step if it is a specific ground state category containing a dry ground surface state category or the dry ground surface state category and a wet ground surface state category;

determining a ground nature category, where the ground nature category is a condition for predicting the state of wear of the tire by the performing machine learning if it is a specific ground nature category comprising an open ground nature category; and determining the state of wear of the tire after a number N of identical predictions in a series M of consecutive predictions.

2. The method for estimating the state of wear of a tire according to claim 1, wherein the method further comprises the following step:

determining a tire running speed category, a breadth of which is a fraction of a maximum running speed, wherein the running speed category is a modality of the performing machine learning.

3. The method for estimating the state of wear of a tire according to claim 2, wherein determining the running speed category of the tire comprises the following steps:

measuring, during a second measuring step, a second measurement of a vibroacoustic signal produced by the tire running on the road surface during a second given time frame to obtain a second completed measurement and a second time signal;

converting, during a second converting step, the second time signal into a second frequency signal over a second frequency range;

segmenting, during a second segmenting step, the second frequency range into at least one frequency band with a predetermined width and associating at least one datum representing the second frequency signal in the at least one frequency band with the at least one frequency band, with the at least one representative datum derived from the second measurement forming the at least one variable of a matrix associated with the second measurement; and determining the running speed category of the tire corresponding to the matrix associated with the second completed measurement, by performing a second machine learning from the data based on a learning database made up of a set of matrices associated with measurements recorded and carried out according to the second measuring step, the second converting step, and the second segmenting step, under known running conditions, according to modalities each representing a running speed category of the tire.

4. The method for estimating the state of wear of a tire according to claim 1, wherein the ground surface state category is included in the group consisting of dry, wet, damp, snowy and icy ground surface state categories.

5. The method for estimating the state of wear of a tire according to claim 1, wherein determining the ground surface state category comprises the following additional steps:

measuring, during a third measuring step, a third measurement of a vibroacoustic signal produced by the tire running on the road surface during a given third time frame to obtain a third completed measurement and a third time signal;

converting, during a third converting step, the third time signal into a third frequency signal over a third frequency range;

segmenting, during a third segmenting step, the third frequency range into at least one frequency band with a predetermined width and associating at least one datum representing the third frequency signal in the at least one frequency band with the at least one frequency band, with the at least one representative datum derived from the third measurement forming the at least one variable of a matrix associated with the third measurement; and determining a ground surface state category corresponding to the matrix associated with the third completed measurement, by performing a third machine learning from the data based on a learning database made up of a set of matrices associated with measurements recorded and carried out according to the third measuring step, the third converting step, and the third segmenting step, under known running conditions, according to modalities each representing at least one ground surface state category.

6. The method for estimating the state of wear of a tire according to claim 1, wherein the ground nature category is included in the group consisting of open, medium and closed ground nature categories.

7. The method for estimating the state of wear of a tire according to claim 1, wherein the specific ground nature category includes ground with an average texture depth that is greater than 0.7.

8. The method for estimating the state of wear of a tire according to claim 1, wherein determining the ground nature category comprises the following additional steps:

measuring, during a fourth measuring step, a fourth measurement of a vibroacoustic signal produced by the tire running on the road surface during a given fourth time frame to obtain a fourth completed measurement and a fourth time signal;

converting, during a fourth converting step, the fourth time signal into a fourth frequency signal over a fourth frequency range;

segmenting, during a fourth segmenting step, the fourth frequency range into at least one frequency band with a predetermined width and associating at least one datum representing the fourth frequency signal in the at least one frequency band with the at least one frequency band, with the at least one representative datum derived from the fourth measurement forming the at least one variable of a matrix associated with the fourth measurement; and determining the ground nature category corresponding to the matrix associated with the fourth completed measurement, by performing a fourth machine learning from the data based on a learning database made up of a set of matrices associated with measurements recorded and carried out according to the fourth measuring step, the fourth converting step, and the fourth segmenting step, under known driving conditions, according to modalities each representing at least one ground nature category.

9. The method for estimating the state of wear of a tire according to claim 8, wherein the step of determining the ground nature category comprises the ground surface state category as a modality of the performing the fourth machine learning.

10. The method for estimating the state of wear of a tire according to claim 1, wherein the machine learning is selected from neural networks, discriminant analysis, support vector machines, boosting, K-nearest neighbors methods and logistic regression.

11. The method for estimating the state of wear of a tire according to claim 1, wherein the state of wear of the tire is selected from new, half-worn, and worn.

* * * * *